Nov. 11, 1930.                J. L. McKEOWN                1,781,517
                             EXPANSION BEARING
                          Filed July 15, 1927           2 Sheets-Sheet 1
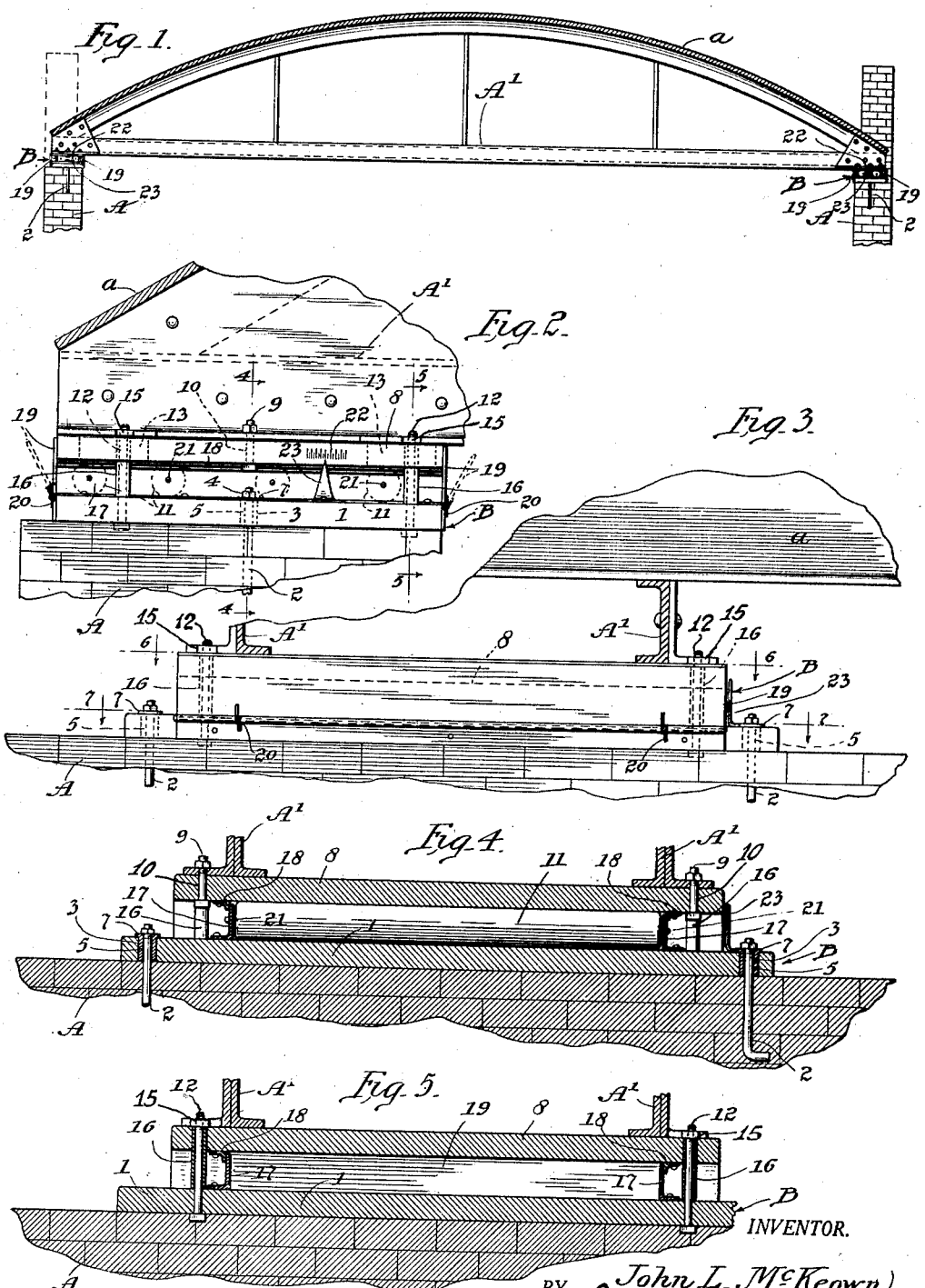
INVENTOR.
BY John L. McKeown
Geo. E. Waldo,
ATTORNEY.

Nov. 11, 1930.  J. L. McKEOWN  1,781,517
EXPANSION BEARING
Filed July 15, 1927   2 Sheets-Sheet 2
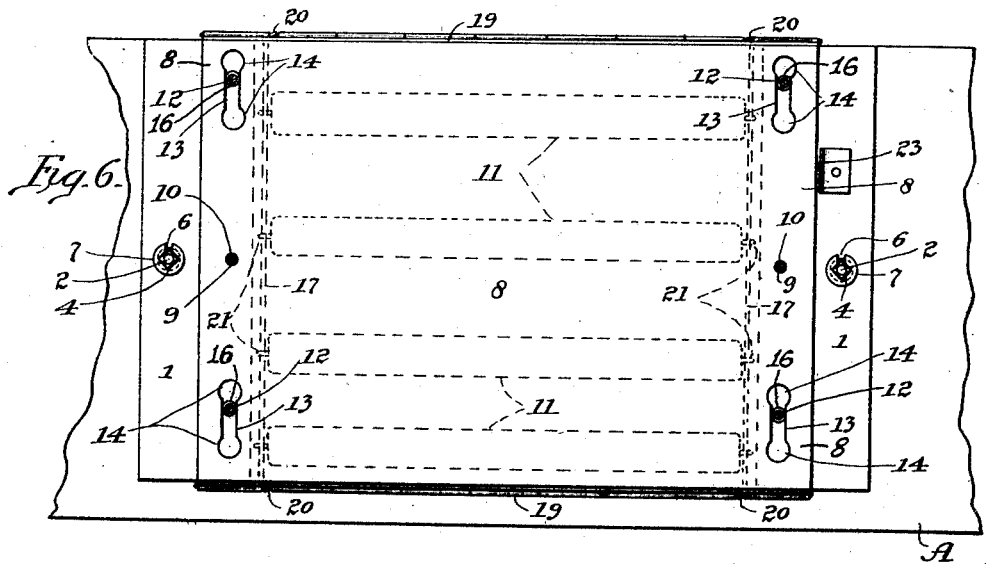
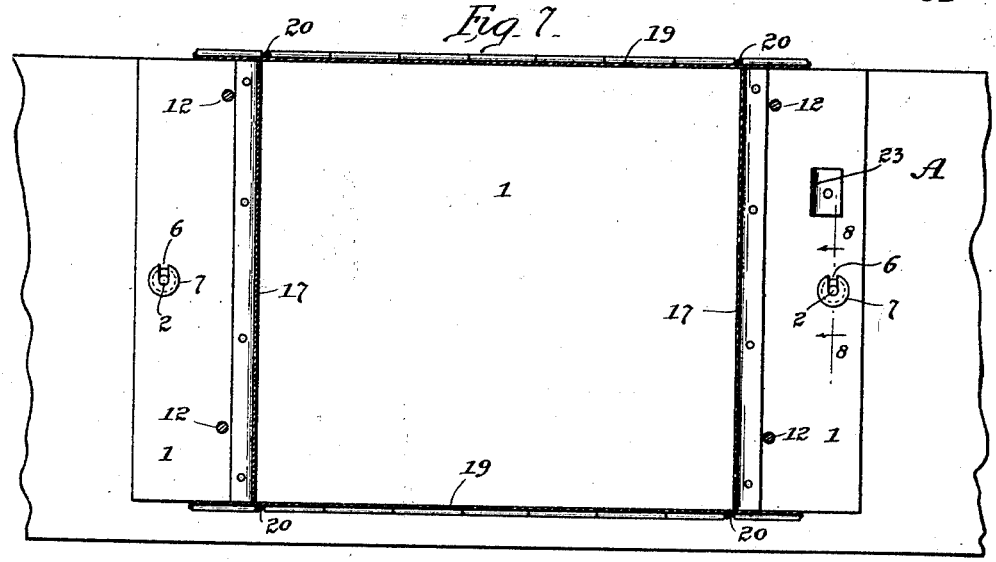
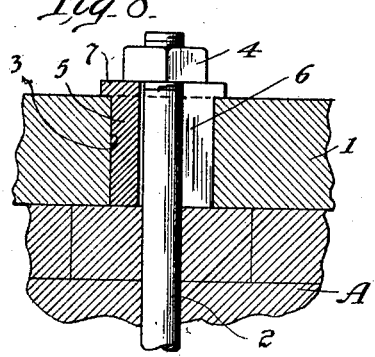
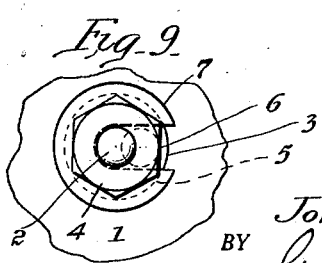
INVENTOR.
John L. McKeown
BY
Geo. E. Waldo
ATTORNEY.

Patented Nov. 11, 1930

1,781,517

UNITED STATES PATENT OFFICE

JOHN L. McKEOWN, OF CHICAGO, ILLINOIS

EXPANSION BEARING

Application filed July 15, 1927. Serial No. 205,945.

This invention relates to building construction and has particular reference to expansion bearings for trusses, beams, girders, and other supporting members, the length of which vary with differences in temperature.

Heretofore, it has been common practice to set plates, usually made of cast iron or steel, into brick and concrete walls and secured in position by means of bolts anchored in the wall, upon which the ends of the trusses, beams, girders, or other similar member commonly employed for supporting floors and particularly the roofs of buildings, rest. So far as I am aware, the sole purpose of such plates has been to distribute the weight of the supporting member resting thereon and also the load carried thereby, over a relatively large surface, no provision being made for movement of the ends of said supporting members on the plates upon which they rest to compensate for variations in their lengths due to linear expansion and contraction thereof under variations in temperature. This variation in length is proportionate to the length of the said supporting members and to the temperature variations and, in the absence of provision for movement of said supported members on their bearings plates, expansion and contraction of said members will result in spreading the walls of the structure, when expansion occurs, and in drawing them together, when contraction occurs, producing distortion of the walls, which I have discovered tends to break the bond between bricks or other separate building units of which the wall is made, which will cause the walls or considerable portions thereof, to collapse when subject to extraordinary stresses, as in the case of collapse of the members supported thereon when subjected to great heat, as in case of fire.

The primary object of the present invention is to provide an expansion bearing designed and adapted for supporting trusses, beams, girders, and other similar structural members, which will permit expansion and contraction of said supporting members without subjecting the walls to stresses sufficient to break the bond between the bricks or other separate building units of which it is made.

To effect the object of the invention, an expansion bearing embodying my invention and improvements, comprises the various features, combinations of features, and details of construction hereinafter described and claimed.

In the accompanying drawings in which my invention is fully illustrated—

Figure 1 is a transverse sectional view of the roof and portions of the side walls of a building, showing expansion bearings embodying my invention and improvements as applied in use for supporting the ends of a truss by which the roof of the building is supported.

Figure 2 is an enlarged view of the left hand expansion bearing shown in Fig. 1, as applied in use.

Figure 3 is a view from the right hand side of Fig. 2.

Figures 4 and 5 are fragmentary sectional views on the lines 4—4 and 5—5, respectively, of Fig. 2.

Figures 6 and 7 are sectional plan views on the lines 6—6 and 7—7, respectively, of Fig. 3.

Figure 8 is an enlarged fragmentary detail sectional view; and

Figure 9 is a detail top plan view of the anchor bolt.

Describing the invention with particular reference to the drawings, in which is shown an expansion bearing embodying my invention and improvements as applied in use for supporting the roof trusses of a building, A designates the side walls of the building which, as shown, are made of brick or other suitable building material; $A^1$ the roof truss made of steel or other material the length of which will vary at different temperatures; $a$ the roof covering; and B expansion bearings, as a whole, set into the walls A, upon which the ends of the truss $A^1$ rest.

The truss $A^1$ may be of any usual or desired construction and exemplifies any form of truss, beam, girder or other supporting member, used for carrying the roofs, floors, or the like, of buildings or bridges.

My improved bearing B comprises a fixed plate 1, shown as seated on the walls A, and secured thereto by means of anchor bolts 2, set in said wall, the upper ends of which extend through holes 3 formed in the plate 1 and threaded to the upper ends of which are nuts 4, all in a usual manner.

In practice, the anchor bolts 2 are set in the wall as said walls are constructed as near as may be in proper position to bring them in registration with the holes 3 in the plates 1. However, in practice, it frequently happens that said anchor bolts are not correctly placed and to provide for conveniently engaging said anchor bolts with the plates the holes 3 are made considerably larger than said anchor bolts and fitted thereto are bushings 5, see particularly Figs. 8 and 9, formed in which are slots 6 which may be described as radial extensions of central holes formed lengthwise through the bushings 5, said slots preferably cutting out at one side of said bushings, respectively.

With the described construction, it is obvious that, by turning the bushings 5 the slots 6 therein may be brought to register with bolts 2 positioned eccentrically to the axes of said bushings. Formed at the upper ends of the bushings 5 are flanges 7 which extend outwardly beyond the sides of the holes 3 and rest upon the exposed surfaces of the fixed bearing plate 1, thus securing said plates in fixed position to their seats on the walls A.

My improved bearing also comprises a second plate 8, best shown in Figs. 4 and 5, which, when the bearing is assembled for use, is adapted to be secured to the ends of the truss, or other supporting member A$^1$, preferable means for this purpose consisting of bolts 9 which extend through holes 10 formed in the plates 8 and parts of the supported members A$^1$.

Interposed between the bearing plates 1 and 8, are anti-friction rollers 11, which may exemplify any desired or approved form of anti-friction member. Also, as assembled for use, see particularly Figs. 2 and 5, the bearing plates 1 and 8 are connected by bolts 12 which extend through holes formed in the fixed bearing plate 1 and through slots 13 formed in said bearing plate 8, said slots preferably being provided with enlargements 14 at their ends which are of sufficient size to permit the passage therethrough of the nuts 15 threaded to the bolts 12, thus forming what may be described as double key-hole slots. The bolts 12 will tie the parts of the bearing together in proper operative position. Also, to prevent the bolts 12 from clamping the bearing plates 1 and 8 upon the anti-friction rollers 11, when the nuts 15 are tightened, and thus binding the same firmly together so that the plates 8 cannot move with the truss A$^1$, as it expands and contracts, spacing sleeves 16 are preferably adjusted over the bolts 12, the lower ends of which rest upon the upper sides of the bearing plates 1, the length of said sleeves being slightly greater than the combined diameter of an anti-friction roller 11 and the thickness of the bearing plate 8, and the width of the slots 13 being sufficiently greater than the diameter of the sleeves 16 to permit said sleeves to move freely therein.

The function of the enlargements 14 at the end of the slots 13 is to render the bearing plates 8, which, as stated, are secured to the trusses or other members A$^1$, self-releasing from the bolts 12, in case said members A$^1$ should collapse—as might occur if weakened by fire—thus preventing the weight of said members A$^1$ from pulling down the walls A, in whole or in part. Obviously, should the members A$^1$ collapse, their over all length would be materially lessened thus drawing the bearing plates 8 secured thereto inwardly and bringing the bolts 12 and the nuts 15 threaded thereto into registration with the enlargements 14 at the ends of the slots 13. When this occurs, tilting movement of the bearing plates 8, caused by collapse of the members A$^1$, will disengage the bolts 12 from the slots 13 in the plates 8, thus permitting movement of said plates with the members A$^1$ without producing stresses in the walls A tending to pull them down.

In accordance with my invention, also, means are provided for defining a substantially dust, dirt and weatherproof chamber between the bearing plates 1 and 8, within which the anti-friction rollers 11 are enclosed. As shown, said chamber is formed by dust guards 17 and 18 secured to the plates 1 and 8, respectively, in such position that they will overlap and will have sliding contact with each other. Said guards 17 and 18 extend substantially at right angles to the axes of the anti-friction rollers 11, the distance between the inner sides of the inner plates 17 being slightly greater than the length of the anti-friction rollers 11. Between the dust guards 17 and 18 at opposite sides of the bearing, the space between the bearing plates 1 and 8 is closed by means of shutters 19, the lower edges of which are hinged to the fixed bearing plate 1 and the free edges of which overlap the bearing plates 8 and are held yieldingly in contact therewith by means of springs 20 applied thereto. The dust guards 17 and 18 and the shutters 19 will prevent access of dust and dirt to the chamber defined thereby, thus preventing any accumulation of dirt on the plates 1 and 8 and rollers 11 which would interfere with movement of the anti-friction rollers 11, which would seriously interfere with contemplated action of said anti-friction rollers and might altogether prevent movement thereof. At the same time, the hinged shutters 19 provide for contemplated movement of the bearing plates 8 relative to the fixed bearing plates 1 and also provide access to the chamber defined by said dust guards and shutters, for the purpose of cleaning the same and for lubricating said anti-friction rollers, if desired.

To insure contemplated alignment and spacing of the anti-friction rollers 11 when the bearings are assembled for use, means are preferably provided for initially mounting said anti-friction rollers upon the dust guards 17 securing to the fixed bearing plate 1, a simple form of mounting consisting of pins 21 made of lead or other suitable frangible material, which are secured in holes formed in the ends of said rollers 11 concentric with their axes and which engage holes formed in said dust guards.

With this construction, it is obvious that when the bearing is subjected to use and the truss $A^1$ or other member is erected with its opposite ends resting upon the bearing plates 8 of bearings B set in opposite walls A, movement of the bearing plate 8 due to expansion or contraction of said member $A^1$ will impart rolling movement to the anti-friction rollers 11 which will shear or twist off the pins 21, thus releasing said rolls and permitting them to turn freely.

In practice, the completed bearing, consisting of the bearing plates 1 and 8, the anti-friction rollers 11, and the dust guards 17 and 18 and the shutters 19, are assembled as a unit before it is placed in the wall. Also, to provide for properly positioning the second plate 8 with reference to the fixed plate 1 to compensate for elongation or contraction of the member $A^1$ corresponding to existing temperature conditions, graduations 22 are formed on one of the bearing plates, as shown on the plate 8, which are referred to an indicator 23 secured in fixed position to the plate 1, the relation being such that at an approximate mean temperature, say 60° F., the indicator 23 will register with the central graduation 22.

I claim:

1. An expansion bearing for the purpose specified, comprising a fixed plate seated on a supporting structure, provided with holes, bolts anchored in said structure, bushings fitted to said holes so as to turn therein provided with slots adapted to receive said anchor bolts, the relation being such that engagement of said slots with bolts posited eccentrically with reference to the centers of said bushings may be effected by turning said bushings axially so that the slots therein will align with said bolts.

2. An expansion bearing as specified in claim 1, which comprises means in association with an anchor bolt for securing a bushing in engagement with the hole in the bearing plate to which it is fitted.

3. An expansion bearing as specified in claim 1, in which the bushings fitted to the holes in said bearing plate comprise flanges at their upper ends forming shoulders which project over the surface of the bearing plate adjacent said holes.

4. An expansion bearing for the purpose specified, comprising a bearing plate adapted to be anchored to a supporting structure, a second bearing plate upon which the member to be supported is adapted to rest directly, anti-friction members interposed between said bearing plates and self-releasing means movably anchoring said second bearing plate to the fixed bearing plate.

5. An expansion bearing as specified in claim 4, in which the means for forming the chamber between said plates within which the anti-friction members are enclosed, comprising shutters hinged to one bearing plate and adapted to bear against the other, and springs applied to said shutters adapted to maintain them yieldingly in contact with parts of the bearing plate other than that to which they are pivoted, thereby permitting movement of said second plate with a supported member and also providing access to the chamber defined thereby.

6. An expansion bearing as specified in claim 4, which also comprises means for forming a closed chamber between said plates within which the anti-friction members are enclosed, comprising pairs of fixed overlapping guard plates secured to said bearing plates, respectively, disposed in line with the direction of expansion and contraction of the supported member, the relation being such that the guard plates secured to one bearing plate will fit between those secured to the other bearing plate with only slight clearance, thereby operating to maintain alignment of said supported member.

7. An expansion bearing as specified in claim 4, which also comprises means for initially mounting said anti-friction members in designed operative positions on a bearing plate, releasable by relative movement of the bearing plates.

8. An expansion bearing as specified in claim 4, which also comprises means to form a closed chamber between said bearing plates within which said anti-friction rollers are enclosed, comprising fixed overlapping guard plates secured to said bearing plates, respectively, and frangible means for initially mounting said anti-friction rollers in operative position on the guard plates on one bearing plate, releasable by relative movement of the bearing plates.

9. An expansion bearing as specified in claim 4, which also comprises means to form a closed chamber between said bearing plates within which said anti-friction rollers are enclosed, comprising fixed overlapping guard plates secured to said bearing plates, respectively, and means for initially mounting said anti-friction rollers in operative position between the bearing plates comprising lead pins secured in fixed guard plates on one of the bearing plates which engage holes formed in the ends of said anti-friction rollers.

10. An expansion bearing as specified in claim 4, in which the means tying the bearing plates together is releasable by collapse of the member supported by said bearing.

11. An expansion bearing as specified in claim 4, in which the means connecting said bearing plates comprises bolts which extend through holes in the fixed bearing plate and slots formed in the second bearing plate through which said bolts extend, and which comprises means to prevent said bolts from binding upon said second plate.

12. An expansion bearing as specified in claim 4, in which the means connecting said bearing plates comprises bolts which extend through holes in the fixed bearing plate and slots formed in the second bearing plate through which said bolts extend provided with enlargements at their ends adapted to permit release of said second bearing plate in case of the collapse of the supported member.

13. An expansion bearing as specified in claim 4, in which the means connecting said bearing plates comprises bolts which extend through holes in the fixed bearing plate and slots formed in the second bearing plate through which said bolts extend, and which comprises means to prevent said bolts from binding upon said second plate, comprising spacing sleeves adjusted over said securing bolts ends of which, respectively, rest upon the fixed bearing plate and which are longer than the combined diameter of an anti-friction member and the thickness of the top bearing plate.

14. An expansion bearing as specified in claim 4, which also comprises means for connecting said second plate to the member supported by said bearing, comprising bolts which extend through holes in said supported member and said second bearing plate.

In witness that I claim the foregoing as my invention, I affix my signature this 8th day of July, A. D. 1927.

JOHN L. McKEOWN.